(12) United States Patent
Banks

(10) Patent No.: US 6,473,476 B1
(45) Date of Patent: Oct. 29, 2002

(54) METHOD AND APPARATUS FOR PROVIDING DETERMINISTIC RESETS FOR CLOCK DIVIDER SYSTEMS

(75) Inventor: Jano D. Banks, Cupertino, CA (US)

(73) Assignee: DVDO, Incorporated, Campbell, CA (US)

( * ) Notice: Subject to any disclaimer, the term of this patent is extended or adjusted under 35 U.S.C. 154(b) by 0 days.

(21) Appl. No.: 09/226,381

(22) Filed: Jan. 6, 1999

(51) Int. Cl.$^7$ ................................................ H03B 19/00
(52) U.S. Cl. ........................ 375/354; 327/117; 377/47
(58) Field of Search ................................ 713/500, 503, 713/400, 300, 323, 324; 327/115, 117; 377/47, 48; 375/354

(56) References Cited

U.S. PATENT DOCUMENTS 5,634,043 A * 5/1997 Self et al. ................... 395/558

* cited by examiner

Primary Examiner—Stephen Chin
Assistant Examiner—Kevin Kim
(74) Attorney, Agent, or Firm—Perkins Coie LLP

(57) ABSTRACT

A clock divider system with reset synchronization includes a divider circuit, a synchronizer circuit, and a synchronous delay circuit. The divider circuit has a clock input, a divider reset input, and a divided clock output. The synchronizer has a clock input, and a synchronous reset input, and a synchronized reset output having an active edge aligned with an active edge of the clock. The synchronous delay circuit has a clock input and a synchronized reset input coupled to the synchronized reset output of the synchronizer, and an output coupled to the divider reset input of the divider. A method for providing reset synchronization for a clock divider system includes developing a reset synchronization signal aligned with an active edge of a clock after receiving an asynchronous reset signal, delaying the reset synchronization signal for at least one cycle to provide a delayed reset synchronization signal, and developing a clock divider reset signal from the delayed reset synchronization signal, that is aligned with an active edge of the clock.

16 Claims, 5 Drawing Sheets

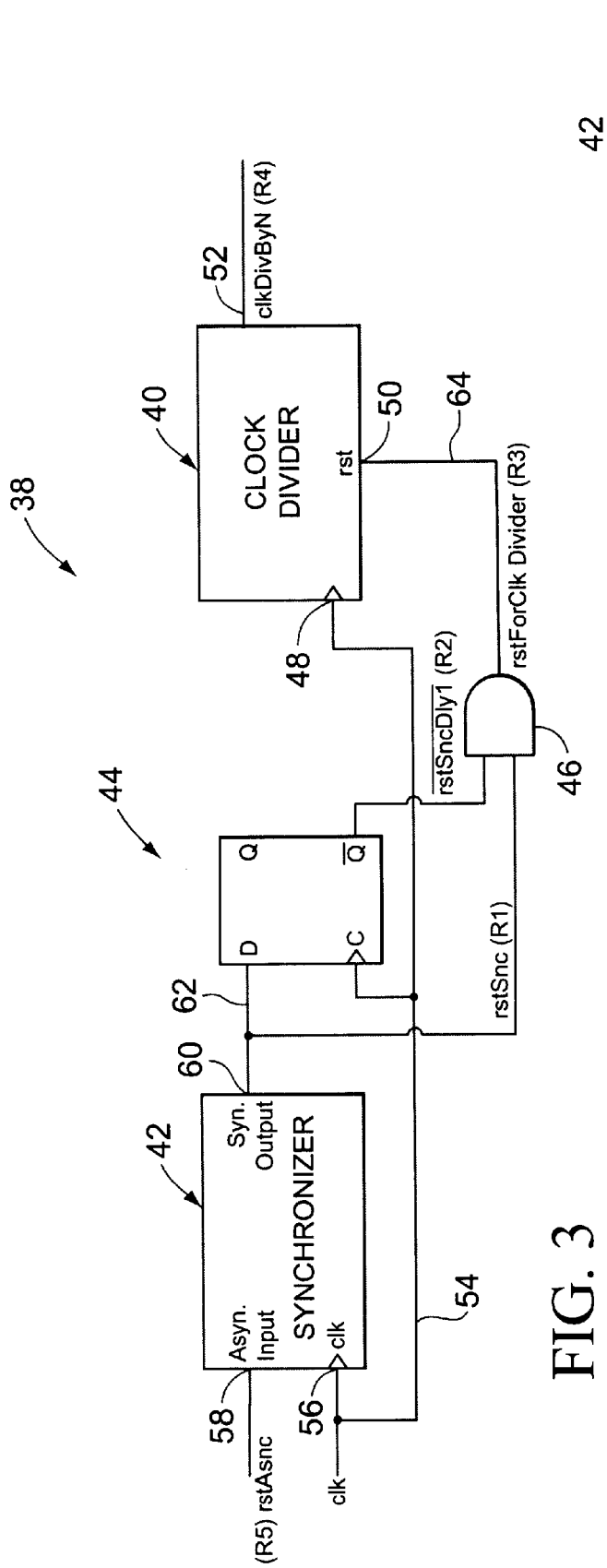
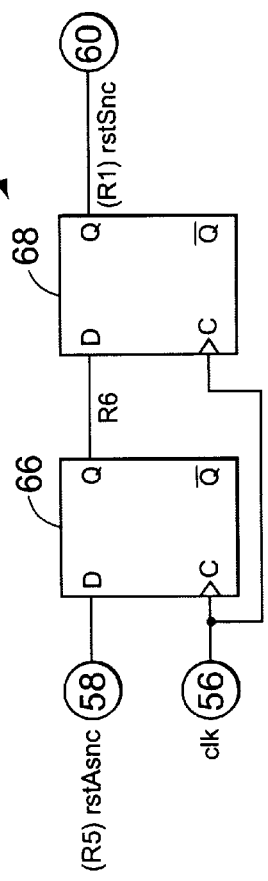
FIG. 3
FIG. 4

US 6,473,476 B1

METHOD AND APPARATUS FOR PROVIDING DETERMINISTIC RESETS FOR CLOCK DIVIDER SYSTEMS

BACKGROUND OF THE INVENTION

This invention relates generally to digital circuits, and more particularly, to methods and apparatus for resetting clock divider systems of digital circuits.

Clock divider systems are used in digital circuits to divide a master or "system" clock into lower frequency clock signals. An idealized clock signal is a series of regularly occurring square wave pulses transitioning from a low ("LO" or "0") state to a high ("HI"or "1") state, and back to a LO state. Adjacent HI and LO states define a single cycle of the clock signal.

Digital circuits are typically triggered by the "active" edge of a clock cycle. The active edge is often the rising edge of the square wave pulse, although it was sometimes alternatively the falling edge of the pulse. To operate properly, a digital circuit usually requires its various components to be synchronized with active edges of the clock cycles.

As noted, the function of a clock divider system is to take a master or "system" clock and to divide it into lower frequencies (i.e., longer cycle) clock signals. Complex digital systems may use a fairly large number of such divided clock signals at various frequencies. However, since all of the clock signals are derived from the original system clock, they are all, in theory, all synchronized to the original system clock.

In FIG. 1, a clock divider 10 includes a number of flip-flops 12 which are connected as a "ripple-type" counter. More particularly, the clock divider 10 includes a number of "D" type flip-flops, where a Q* (Q Bar) output of the flip-flop is coupled to a D input of the flip-flop. The first flip-flop 12 has its clock input C coupled to the system (or other) clock "clk" and has its Q output coupled to the clock input C of the next flip-flop 12 in the line. The Q output of the last flip-flop 12 is the divided output 14 of the clock divider 10.

With the ripple-type clock divider of FIG. 1, the Q output of each of the flip-flops 12 is one-half the frequency of its input clock. Therefore, the Q output of the first flip-flop 12 is one-half of that of the system clock, the Q output of the second flip-flop 12 is one quarter of that of the system clock, and the output of the nth flip-flop 12 is $\frac{1}{2}^n$ of that of the system clock.

As will be discussed in greater detail subsequently, there are times when it is necessary to deterministically know the state of each of the flip-flops in the clock divider 10. For this reason, a reset (R) input is provided to reset all of the flip-flops 12 to a known state. Typically, this known state is Q=0 and, of course, Q*=1, although in other types of flip-flops a reset may set Q to 1 and Q*to 0. This reset signal can be derived from a number of sources. For example, a reset signal on a line 16 can come from a signal applied to a system reset pin 18 via system reset logic 19, a test reset pin 20, or JTAG pins 22 via JTAG logic 24. These pins 18, 20, and collectively 22 are all typically external pins of an integrated circuit package. The JTAG pins 22 are coupled to JTAG logic 24, which, among other things, can provide a reset. signal on line 16.

The problem with ripple-type clock dividers such as clock divider 10 of FIG. 1, is that the divided output signal 14 is not precisely synchronized with the system clock. This is because each of the flip-flops 12 develop a slight time delay, which means that the active edge of its output signal is phase-shifted from the active edge of the system clock. Since this problem increases with each additional flip-flop or "stage" of the clock divider 10, ripple-type clock dividers tend not to be used unless the divider has only one or two stages.

A more versatile clock divider system 26 is illustrated in FIG. 2. This clock divider 26 is a divide-by-N type divider, with a one-clock-width high time. The advantage of the divide-by-N counter is that the divided output 28 is a clock having active edges that are well synchronized with that of the system clock clk. The divider 26 includes a counter 30, a decoder 32, and a flip-flop 34. To divide, for example, by 8, the number 7 (111 in binary) is loaded into the counter 30, and then the counter 30 counts down to zero. When the decoder 32 determines that the count of the counter 30 has reached zero, an output on a line 35 changes state to simultaneously prepare the counter 30 to reload the number 7 (i.e., Q1=Q2=Q3=1) into the counter 30 and to change the state at the D input of flip-flop 34. The signal on line 35 is re-synchronized with the system clock via the clock input C of flip-flop 34 to provide a synchronous clock signal on line 28 which is one-eighth of the frequency of the system clock. Other frequency divisions are possible by loading other numbers into the counter 30. Since the clock divider 26 also must be reset to a deterministic state for various purposes, a reset line 36 may be coupled to the system reset pin 18 via system reset logic 19, the test reset pin 20, and/or the JTAG pins 22 via JTAG logic 24.

It should be noted that there are a great many types of clock divider circuits in addition to those illustrated by FIGS. 1 and 2. For example, there are clock divider circuits which divide a system clock by a fractional number, and divider implementations which use other flip flop types, such as toggle flip flops and JK flip flops. However, as noted previously, there are times when the state of the clock divider, no matter what type, must be known, requiring a methodology for deterministically resetting the clock dividers.

One of those times that it is imperative to know the starting states of a clock divider system is during the testing of integrated circuits as part of the manufacturing process. Realistically, complex digital integrated circuits cannot be manufactured without extensive operability testing. This is because the manufacture of integrated circuits is imperfect and even one defective gate or transistor can ruin the reliability or even the functionality of the chip.

Digital integrated circuit chips are typically tested by test programs containing what is known as "test vectors". Test vectors are a string of bits containing input stimulus bits (to be applied to input pins) and output checking bits (to be compared with the output pins). For each of the test vectors, the program applies the input stimulus bit values to the input pins and checks the output pins against the output checking bit values for each ΔT, comparing the actual outputs with the predicted output values based upon the desired functionality of the integrated circuit.

The problem with this scenario is that it is necessary to know the state of the internal memory-type devices, (such as the flip-flops, counters, registers, etc.), of the integrated circuit before the test vectors can be successfully applied to the circuits. Since on "start up", the contents of such memory-type devices are essentially random, most chip designers provide an external test reset pin or JTAG pins to reset memory-type devices of the system to a known state. As is well known to those skilled in the art, in addition to resetting memory-type devices, JTAG functionality allows for a great deal of testing of integrated circuits and their interconnections, permitting "boundary scan" tests, etc.

The problem with adding a pin 20 just to reset the clock dividers is that it adds another pin to the integrated circuit package. However, each additional pin comes at a significant economic cost. For example, an additional pin may require a larger IC package, which can be considerably more expensive than a lower pin-count package. Furthermore, adding another pin adds another bit to the test vectors which, in theory, can double the amount of test vectors that must be generated to fully test the chip. Since there is an appreciable cost associated with the use of test equipment, the extra pin therefore adds to the complexity and expense of testing the chip.

SUMMARY OF THE INVENTION

The present invention provides a method and apparatus for providing deterministic resets for clock divider systems and the like. The invention does not require the use of an additional, external test reset pin, and as a consequence, saves on pin count, on testing complexity, and possibly on integrated circuit package size.

Briefly, a clock divider system with reset synchronization includes a divider circuit, a synchronizer circuit, and a synchronous delay circuit. The clock divider circuit has a clock input, a divider reset input, and a divided clock output which is at a lower frequency than that at the clock input. The synchronizer circuit has a clock input and an asynchronous reset input, and synchronized reset output having an active edge aligned with an active edge of the clock. The asynchronous delay circuit has a clock input and a synchronized reset input coupled to the synchronized reset output of the synchronizer, and an output coupled to the divider reset input of the divider.

A method for providing reset synchronization for a clock divider system includes the operations of receiving an asynchronous reset signal, developing a reset synchronization signal aligned with an active edge of a clock, delaying the reset synchronization signal for at least one cycle to provide a delayed reset synchronization signal, and developing a clock divider reset signal from the delayed reset synchronization signal which is aligned with an active edge of the clock. Preferably, the operation of developing a reset synchronization signal includes first developing a pre-reset synchronization signal aligned with the next active edge of the clock, and developing the reset synchronization signal from the preset synchronization signal in alignment with the next active edge of the clock. Other methods of synchronization besides the dual rank synchronizer method are possible.

The present invention therefore uses an already existing asynchronous system reset signal to produce a test reset signal which deterministically resets the divide-by-N clock divider circuits. The requirement for a separate, external test reset pin has therefore been eliminated. This reduces the complexity of the integrated circuit, reduces the complexity and cost of testing the integrated circuit, and consequently reduces the cost of the integrated circuit.

These and other advantages of the present invention will become apparent to those skilled in the art upon a reading of the following descriptions of the invention and a study of the several figures of the drawing.

BRIEF DESCRIPTION OF THE DRAWINGS

FIG. 3 is a block diagram of a clock divider system with reset synchronization in accordance with the present invention;

FIG. 4 is an exemplary synchronizer used in the circuit of FIG. 3;

DETAILED DESCRIPTION OF THE PREFERRED EMBODIMENTS

Figure 1:
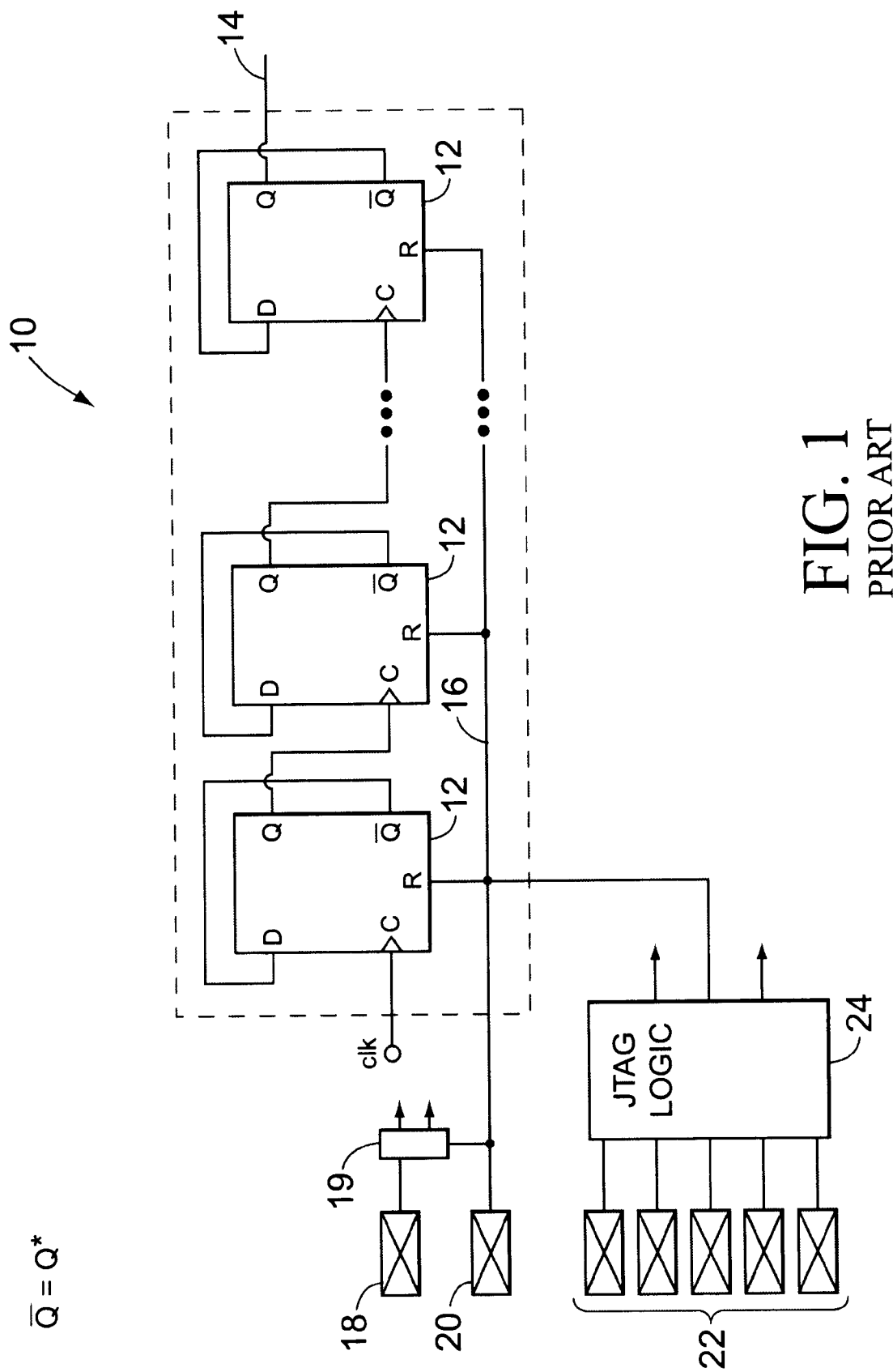
FIG. 1 is a schematic diagram of a clock divider of the prior art.
Figure 2:
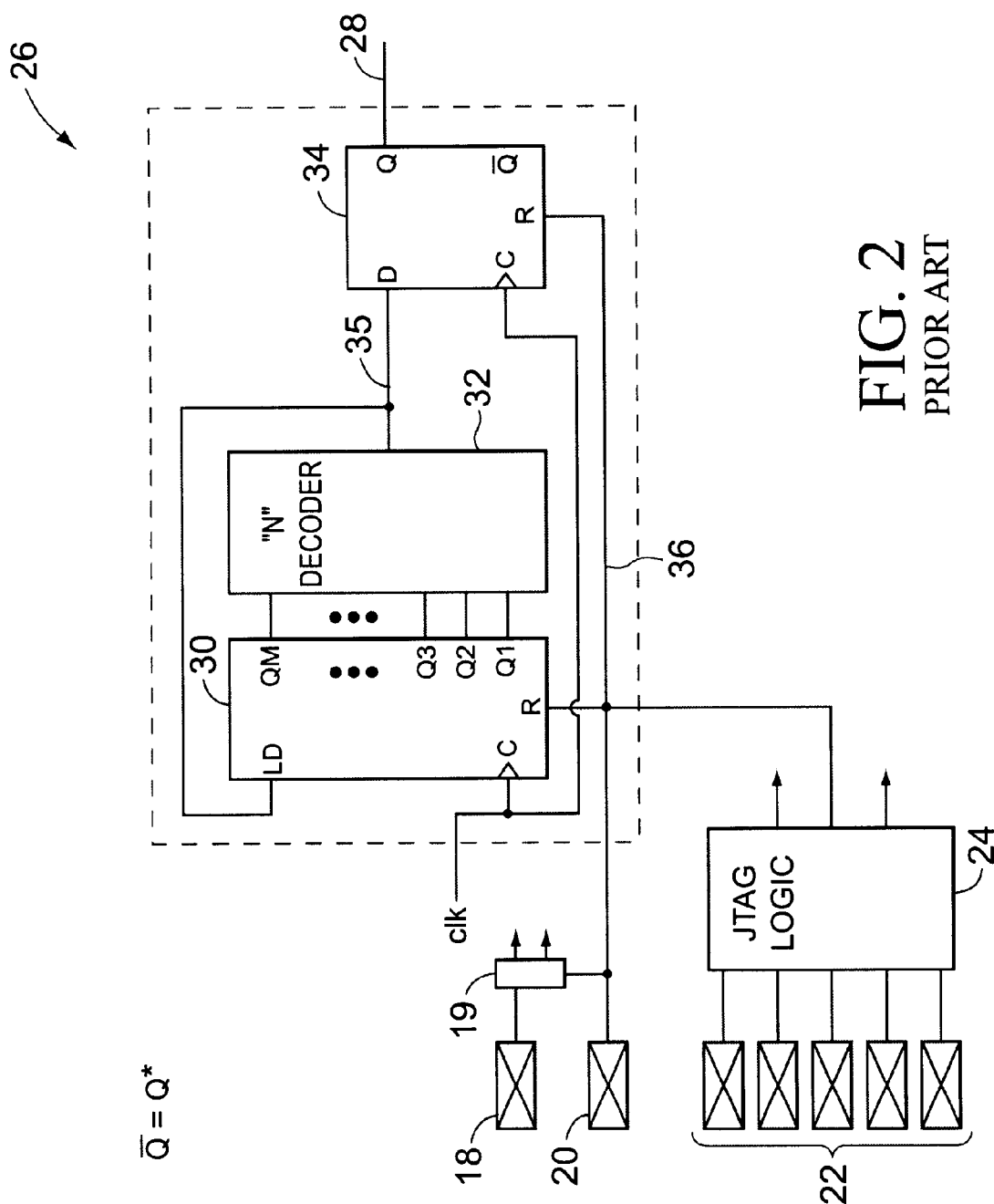
FIG. 2 is a block diagram of an alternative clock divider of the prior art.

FIGS. 1 and 2 were described with reference to the prior art. In FIG. 3, a clock divider system 38 in accordance with the present invention includes a divider circuit 40, a synchronizer circuit 42, and a synchronous delay circuit 44. Also included in the exemplary clock divider system 38 of FIG. 3 is combinatorial logic 46.

The clock divider 40 can be of any clock divider type having a clock input 48 and a divider reset input 50. The clock divider 40 has a divided clock output on a line 52, which is typically some integral fraction of the master or system clock "ctk", here shown applied to a line 54. Alternatively, some clock dividers 40 that can be used in the combination of the present invention, divide by other than integral denominators, as is understood by those skilled in the art. Examples of clock dividers that can be used with the clock divider system 38 were illustrated and described with reference to FIGS. 1 and 2.

The synchronizer 42 has a clock input 56, an asynchronous input 58, and a synchronous output 60 which develops a synchronized reset signal rstSnc on a line 62. As will be described in greater detail with reference to FIG. 5, this signal rstSnc is synchronized with an active edge of the system clock clk.

The delay 44, in this embodiment, is a D-type flip-flop having a D or data input, a C or clock input, a non-inverted output Q, and an inverted output Q*. The D input is coupled to the output 60 of the synchronizer 42 by line 62, and the clock input C is coupled to the system clock clk by line 54. The Q output of the flip-flop 44 is not used in this embodiment, and the Q* output is coupled to combinatorial logic 46. A signal rstSncDlyl* (rstSncDlyl Bar) is produced at the output Q* of the delay 44.

In the present example, the combinatorial logic 46 is represented by an AND gate. Of course, as will be appreciated by those skilled in the art, other logic elements can be used, in combination, to provide similar functionality. In this instance, the AND gate 46 has as inputs the signals rstSnc and rstSncDlyl*, and has as an output, a signal rstForClkDivider on a line 64. This line 64 is coupled to the reset input 50 of the clock divider 40 to provide a deterministic reset of the clock divider. By "deterministic" it is, of course, meant that the reset is such that it always occurs after an exact number of active clock edges from the active clock edge upon which the rstAsnc signal's transition from its deasserted state to its asserted state is sampled.

In FIG. 4, an example of a synchronizer 42 is illustrated. It will be appreciated by those skilled in the art that there are many designs for synchronizers, and that the synchronizer illustrated in FIG. 4 is simply representative of that class of synchronizers. The exemplary synchronizer 42 includes a first flip-flop 66 and a second flip-flop 68. Each of the flip-flops 66 and 68 are D-type flip-flops, including a D input, a C input, a Q output, and a Q* output. However, in this embodiment, the Q* outputs are not used, and can be omitted from the flip-flop circuitry, if desired. The asynchronous input 58 of a signal rstAsnc is coupled to the D input of flip-flop 66, and the system clock clk is coupled to the clock inputs C of both the flip-flop 66 and 68. The Q output of flip-flop 66 is coupled to the D input of flip-flop 68. The signal rstSnc developed by the synchronizer 42 is developed at output 60.

The operation of the synchronizer circuit 42 illustrated in FIG. 4 will be well understood by those skilled in the art. In the instance when the asynchronous reset rstAsnc occurs near a clock edge, it can provide a metastable condition in the flip-flop 66. While the flip-flops 66 typically operate quite rapidly, they do require some setup and hold time on the signal at the D input at around the time of the active edge of the clock pulse is present at the clock input C. This setup time is typically in the order of a few nanoseconds to less than a nanosecond. If the asynchronous signal occurs outside of this setup and hold time, the next active edge of the clock will create a synchronized reset signal on the Q output of the flip-flop 66. However, if the asynchronous signal is within the setup and hold time of the active edge of the system clock clk, a metastable or indeterminate output is developed at the Q output of flip-flop 66 and has a certain probability that it will become stable by the next active clock edge. A second flip-flop 68 is added to further increase the probability of reaching a stable state by the next active edge of the system clock clk. The metastability of synchronizers is well known to those skilled in the art, who will appreciate that the probability of an error due to metastability with a single flip-flop 66 is high enough to cause real errors within a human lifetime, while the probability of an error due to metastability with two flip-flops 66 and 68 is too low to be of concern.

Figure 5:
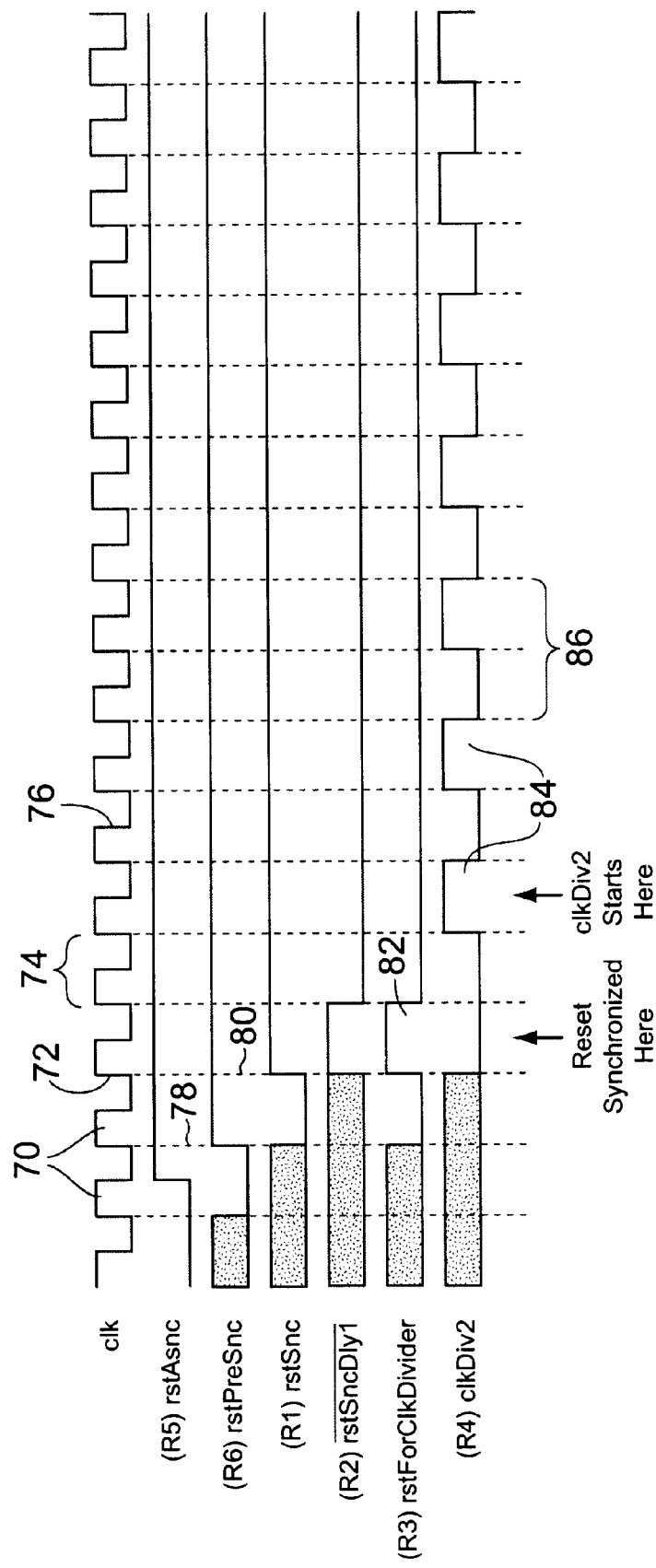
FIG. 5 is a timing diagram illustrating the process of the present invention and the operation of the apparatus of the present invention with a divide-by-2 circuit example.

The operation of the clock dividing system 38 of FIG. 3 will describe in greater detail with reference to FIG. 5. A master or system clock clk includes a number of theoretically square wave pulses 70. The square waves are only theoretically square, since the rising and falling edges of the pulse are not precisely perpendicular. In this example, the pulses 70 have an active leading edge 72, and the period of time between two active leading edges comprise a clock cycle 74. As explained previously, other systems use falling edges 76 as the active edge, and in still other systems, both rising edges 72 and falling edges 76 are used. However, in this illustrative example, it will be assumed that the active edge of clock cycle 74 is the rising edge of the cycle.

In the present embodiment, the asynchronous reset signal rstAsnc should be de-asserted (i.e., at a "LO" level) for at least one clock cycle, and then become asserted. This sequence is required for simulation and test vector generation so that the circuit will detect the start of a transition from the deasserted state to the asserted state, or the "start" of a system reset. If the reset was never de-asserted, rstForClkDivider would never become asserted, and the divide-by-N clocks would never become a known state in simulation. Though, in a real integrated circuit, the divide-by-N clocks would resolve to a known state, but that state is not deterministic to an exact clock edge.

In real operation, only relative clock-to-clock relationships are important, but in test programs, it is imperative that the time that a signal resolves to a particular state be exact. Otherwise, the test program will fail a statistical number of chips, likely 50% over time, as with a coin flip probability, because the circuits will start up at the wrong time expected in the test program 50% of the time. A 50% yield is unacceptable for high volume manufacturing. To force designers to account for this requirement in clock divider circuits, simulators are designed so that they will not resolve a flip-flip to a known state until a reset is asserted, which guarantees a deterministic startup of the circuits for test program generation. However, asserting such a reset requires adding an additional pin to the integrated circuit package, which is undesirable for many reasons as previously discussed.

It should be noted that the circuit creates the rstForClkDivider signal by synchronizing the rstAsnc signal (which can be the external system reset pin of the chip, but which can also be an internal signal). This is accomplished by running it through the synchronizer 42, the delay 44, and the combinatorial logic 46. More particularly, the asynchronous reset signal rstAsnc causes the flip-flop 66 to create the signal rstPreSnc on the next active clock edge 78 which, in turn, creates the synchronous reset rstSnc on the following active clock edge 80.

It should be noted that if the synchronizer uses a different method than that of a dual rank synchronizer, the clock edge at which the reset signal rstSnc is asserted will occur at a different clock edge. The reset signal rstSnc is applied to the AND gate 46 along with the delayed synchronous reset signal rstSncDlyl* to provide a one-system-clock-cycle duration pulse 82, which is applied to the reset input 50 of the clock divider 40.

In the example of FIG. 5, the clock divider 40 is implemented as a divide-by-2 divider producing an clkDivByN signal "clkDiv2." The clock divider 40 is provided with a deterministic, synchronized reset by pulse 82 and, after two cycles, begins producing a series of pulses 84 having their active clock edges aligned with the active edges of the system clock clk. However the cycle length 86 of the signal clkDivByN is twice the cycle length 74 of the system clock. In other words, the frequency of clkDivByN in this example is one-half the frequency of the system clock clk.

Figure 6:
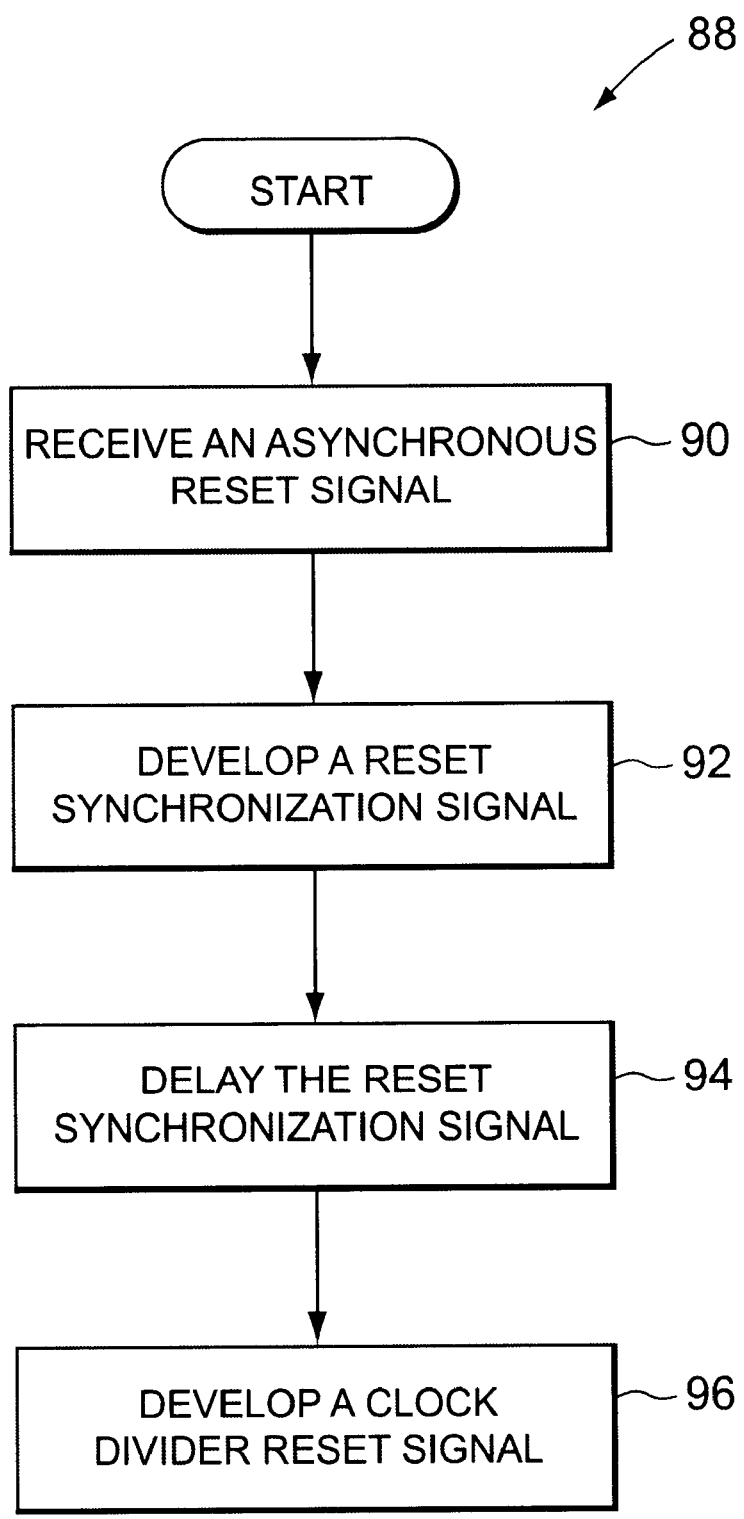
FIG. 6 is a flow diagram illustrating the process operations of the present invention.

In FIG. 6, a process 88 for deterministically resetting and synchronizing a clock divider system includes the operation 90 of receiving an asynchronous reset signal, the operation 92 of developing a reset synchronization signal from the asynchronous reset signal, the operation 94 of delaying the synchronization signal, and the operation 96 of developing a clock divider reset signal from the delayed reset synchronization signal. These operations coincide with the explanation given with reference to FIG. 5 of the operation of the clock dividing system 38 of FIG. 3.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A clock divider system with reset synchronization comprising:
   a divider circuit having a clock input, a divider reset input, and a divided clock output, wherein said divided clock output has a frequency less than that of said clock input;
   a synchronizer circuit having a clock input and an asynchronous reset input, said synchronizer having a synchronized reset output having an active edge aligned with an active edge of a clock signal applied to said clock input of said synchronizer circuit; and a synchronous delay circuit having a clock input and a synchronized reset input coupled to said synchronized reset output of said synchronizer and an output coupled to said divider reset input of said divider.

2. A clock divider system with reset synchronization as recited in claim 1 wherein sad divider circuit includes a ripple-type divider.

3. A clock divider system with reset synchronization as recited in claim 1 wherein said divider circuit includes a divide-by-N type divider.

4. A clock divider system with reset synchronization as recited in claim 1 wherein said synchronizer circuit includes a flip-flop having an input and an output.

5. A clock divider system with reset synchronization as recited in claim 4 wherein said flip-flop is a first flip-flop, and wherein said synchronizer circuit includes a second flip-flop having an input and an output, where said output of said first flip-flop is coupled to said input of said second flip-flop.

6. A clock divider system with reset synchronization as recited in claim 1 wherein said synchronous delay circuit includes a delay flip-flop.

7. A clock divider system with reset synchronization as recited in claim 6 wherein said synchronous delay system further includes a logic circuit responsive to an output of said delay flip-flop and to said synchronized reset output.

8. A clock divider system with reset synchronization as recited in claim 7 wherein said logic circuit comprises an AND gate.

9. A method for providing reset synchronization for a clock divider system comprising:

receiving an asynchronous reset signal;

developing a reset synchronization signal aligned with an active edge of a clock after said received asynchronous reset signal;

delaying said reset synchronization signal for at least one cycle to provide a delayed reset synchronization signal; and developing a clock divider reset signal from said delayed reset synchronization signal that is aligned with an active clock edge of said clock.

10. A method for providing reset synchronization for a clock divider system as recited in claim 9 wherein developing a reset synchronization signal includes developing a pre-reset synchronization signal aligned with a next active edge of said clock; and developing said reset synchronization signal from said pre-reset synchronization signal.

11. A method for providing reset synchronization for a clock divider system as recited in claim 10 wherein said reset synchronization signal is aligned with the next active edge after that of the pre-reset synchronization signal.

12. A method for providing reset synchronization for a clock divider system as recited in claim 11 wherein said delayed reset synchronization signal comprises a reset pulse having a width of one clock cycle.

13. A method for providing reset synchronization for a clock divider system as recited in claim 12 wherein said reset pulse is of an opposite polarity of a portion of said reset synchronization signal that precedes said reset pulse by one clock cycle.

14. A method for providing reset synchronization for a clock divider system as recited in claim 9 wherein said clock divider reset signal is additionally derived from said reset synchronization signal.

15. A method for providing reset synchronization for a clock divider system as recited in claim 14 further comprising logically combining said reset synchronization signal and said delayed reset synchronization signal to provide said clock divider reset signal.

16. A reset synchronizer for a clock divider system comprising:

means for developing a reset synchronization signal aligned with an active edge of a clock after receiving an asynchronous reset signal;

means for delaying said reset synchronization signal for at least one cycle to provide a delayed reset synchronization signal; and means for developing a clock divider reset signal from said delayed reset synchronization signal that is aligned with an active clock edge of said clock.

* * * * *